United States Patent [19]
Braukmann

[11] 3,811,403
[45] May 21, 1974

[54] INDICATOR DEVICE FOR ROTARY ELEMENTS

[76] Inventor: Heinrich Braukmann, 8 Drosselweg, Mosbach, Germany

[22] Filed: Sept. 11, 1972

[21] Appl. No.: 288,151

[30] Foreign Application Priority Data
Sept. 21, 1971 Germany.............................. 2147000

[52] U.S. Cl. ............................................. 116/125
[51] Int. Cl............................................. F16k 37/00
[58] Field of Search ............ 116/125; 137/551, 553; 251/213, 264, 318

[56] References Cited
UNITED STATES PATENTS
1,338,263 4/1920 Thorne et al....................... 116/125
1,386,065 8/1921 Lofton................................. 116/125

*Primary Examiner*—Louis J. Capozi
*Attorney, Agent, or Firm*—William Anthony Drucker

[57] ABSTRACT

An indicator device for a rotatable component such as a valve spindle. The device includes a housing having a cylindrical bore, a roller element mounted for rotatable movement relative to the housing, a pressure mechanism mounted within the roller element for pressing the element against the wall of the bore to locate the element eccentrically of the bore and an indicating device for indicating the relative position between the housing and the roller element. The pressure mechanism is non-rotatably mounted with the rotatable component and relative position between the housing and roller element is indicated by the indicating device.

11 Claims, 6 Drawing Figures

PATENTED MAY 21 1974 3,811,403

INDICATOR DEVICE FOR ROTARY ELEMENTS

The invention relates to an indicator device for rotatably mounted components, particularly for valve spindles. Its purpose is to indicate the exact position into which the component or valve spindle has rotated and thus to provide a means of accurate adjustment for apparatus a setting or regulating operation is performed with the rotation of the component. Needless to say, accurate adjustments of the stroke or of a longitudinal movement quite generally can likewise be effected therewith, provided the longitudinal movement is obtained by a rotation of the component connected with the indicator device. The stroke adjustment of the shut-off device of a slide, valve or similar device may be mentioned as a special example of the foregoing.

The known mechanical indicator devices of this kind are insufficiently accurate. It is only the beginning and the end of the adjustment range that they indicate with some degree of accuracy. This proves a particularly serious drawback in the case of regulating valves, so that the problem arises of providing a mechanical indicator device of the aforementioned kind which will be characterized by a particularly simple construction on the one hand and by a high degree of accuracy on the other.

For the solution of this problem an indicator device of the aforementioned category is proposed which, according to the invention, comprises an indicator device for rotatable component such as a valve spindle, which includes a housing having a cylindrical bore; a rolling element mounted for rotatable movement relative to the housing; pressure means mounted within the rolling element for pressing the rolling element against the wall of the bore to position the element eccentrically within the cylindrical bore, which pressure means is adapted for non-rotatable connection with the rotatable component and means for indicating the relative position between the housing and the rolling element, wherein upon relative movement between the housing and the rolling element an indication is provided representative of the operative position of the rotatable element. device being connected in a manner not allowing rotation in relation thereto, with the rotatable component or with an element rotatorily connected therewith, while that one of the said two units which is not so connected occupies a fixed position. In one alternative, therefore, the housing is fixed in position in relation to a valve housing, for instance, while the contact pressure device in the aforementioned example rotates together with the valve spindle. The valve spindle and the contact pressure device can be directly or indirectly coupled together. Owing to the friction contact or form-locking principle the rolling element rolls over the inside of the boring of the housing when the contact pressure device rotates, but its angle of rotation, owing to the fact that its outer diameter is smaller than the boring, is greater than the angle of rotation of the contact pressure device. This difference is a measure of the rotation of the component or of the valve spindle and thus, in the end, of the height of lift of the closing device likewise. Needless to say, care must be taken to ensure that no slip occurs, as otherwise the accuracy of the indicating device cannot be guaranteed. In a form-closed connection between the rolling element and the housing no slip can occur, with the exception, for instance, of the tooth clearance in a cogging system.

In a second version the housing is rotated together with the component while the contact pressure device occupies a fixed position in relation to these parts. The effect is in itself exactly the same, i.e., in this version likewise the difference in the angles of rotation is utilised as an indicating means. The advantage of this version resides in the reading to be retained for all indications arising.

The rolling element is advantageously provided with graduated scale and the housing with a reading mark. In a preferred embodiment of the invention the housing is rigid while the contact pressure device for the rolling element is rotatable together with the component. In this case the housing can be made in one piece with some other component, such as the top part of a valve.

The rolling element, according to a further characteristic of the invention, consists of a ring of which the interior contains the contact pressure device. This provides a very compact construction. The contact pressure device or a mere part thereof is resiliently pressed in a very advantageous manner against the rolling element or takes the form of a resilient element. In this case the contact pressure is naturally the greater, the greater the elastic force. On the other hand, the danger of slip between housing and rolling element, in the event of a connection based solely on the force-locking principle, decreases with increasing spring tension.

According to a further characteristic of the invention the contact pressure device consists of a sliding part, a roller or the like, as well as of a supporting body and connecting device, the latter being constructed as a spring-mounted arm or resilient telescopic arm. The spring-mounted arm may be formed, for example, by a leaf-type spring, while the telescopic arm consists, in the usual manner, of two parts displaceable in respect of each other, a pressure spring being interposed between them. In all cases, the required radial pressure must be provided for the friction contact or for the satisfactory engagement of the system of cogs.

As a further development of the invention the rolling element is provided on the outside, over at least part of its cylinder height, with a material having a high coefficient of friction, particularly rubber or plastic, in addition to which the boring in the housing is slightly roughened to ensure firmer contact. In another version of the invention the rolling element is provided with an external and the housing with an internal system of cogging, i.e., they are interconnected via a form-locked system which obviates all slip and thus guarantees maximum accuracy.

A further feature of the invention is characterised by the fact that the reading mark is formed by the side edge of a window of the housing or is provided on the said window, while the indicator scale is provided on the outer periphery of the rolling element. Finally, it is of great advantage, in the case of an indicator device for a rotatable threaded spindle, for the latter to be provided with a longitudinal groove engaged by the free end of a screw, by an adjusting spring or by an attachment which belongs to the housing connected thereto in a torsionally rigid manner or to the contact pressure device and which extends radially inwards.

A further version of the invention is characterised by the fact that the contact pressure device is provided with a casing which can be mounted on the component or on the valve spindle and which serves as a supporting body and which, at the same time, is constructed as a bearing shaft for the housing. This constructional version is particularly economical to manufacture.

The drawing illustrates two examples of the invention. The diagrams are as follows.

Figure 1:
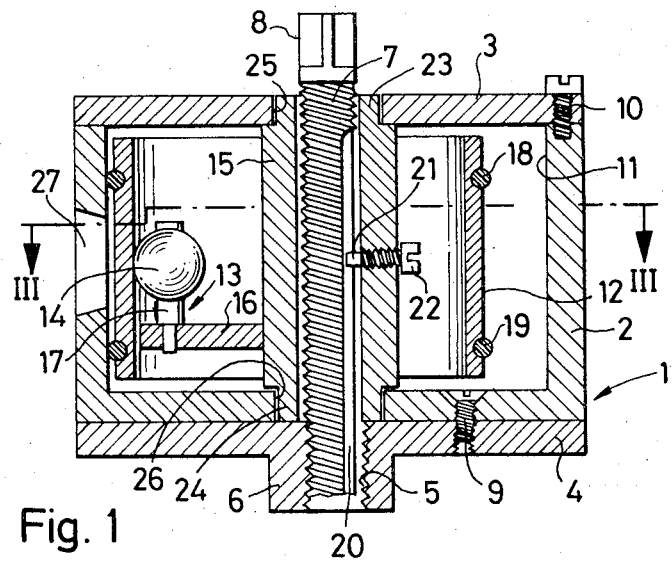
FIG. 1 is a vertical longitudinal section through a first version of the invention.

In a first example the housing 1 of the indicator device according to the invention consists of a pot-shaped part 2 and a cover 3. A flange 4 is connected with the base of the pot-shaped part 2, a threading 5 being cut into the central boring of the said flange, the said boring being prolonged by a neck 6 and the said threading interacting with the threading 7 of a valve spindle 8. The pot-shaped part 2 and the flange 4 are interconnected by screws 9, while the edge of the pot is connected with the cover 3 by screws 10.

The housing 1 is provided with a cylindrical boring 11 containing an annular rolling element 12. This latter, owing to the contact pressure device 13, assumes an eccentric position in the said boring 11. The contact pressure device 13 consists of a spherical contact pressure roller 14, a sleeve-shaped supporting body 15 and an arm serving as a connecting element 16. The said arm is provided at its free end with a bearing shaft 17 for the contact pressure roller 14. The contact pressure roller 14 consists of a highly elastic material, such as rubber, to enable the rolling element 12 to be resiliently pressed against the cylindrical boring 11. The two packing rings fitted tightly into external grooves of the rolling element 12 serve to ensure friction contact, free of slip, between the said rolling element 12 and the housing 1 or its boring 11.

The valve spindle 8 is provided with a longitudinal groove 20 engaged by the inner end 21 of a screw 22 passing radially through the sleeve-shaped supporting body 15. The spindle 7 is thus able to undergo longitudinal displacement in the casing but cannot rotate relative to the sleeve, so that a torsionally rigid connection is provided between the spindle 7 and the contact pressure device 13. In contrast thereto the housing 1 can rotate about the spindle 7. For this purpose the two ends of the casing 15 are advantageously constructed as bearing pins 23, 24, resting in bearing borings 25 and 26 of the housing 1. When the housing 1 is screwed on to the spindle 7, therefore, this results in a longitudinal displacement of the contact pressure device in the longitudinal direction of the spindle.

Owing to the torsionally rigid connection between the spindle and the contact pressure device 13 the contact pressure roller 14 moves along a path parallel to the internal boring 11 of the housing 1 when the spindle 7 is rotated. In this process the element 12 situated between them rolls over the said internal boring 11. As the external periphery of the rolling element 12 is greater than the internal periphery of the cylinder boring 11, a rotation of the rolling element through 360° is effective upon the rotation of the spindle through more than 360°. The difference in these angles of rotation, which, if the system is free of slip, depends solely on the difference between the two diameters, is utilised, according to the invention, for indication purposes. For this reason, the housing 1 is provided with a reading window 27 which interacts with a graduated scale on the outer periphery of the rolling element 12. Either the two side edges of the window or its centre can be used as reading marks.

Figure 3:
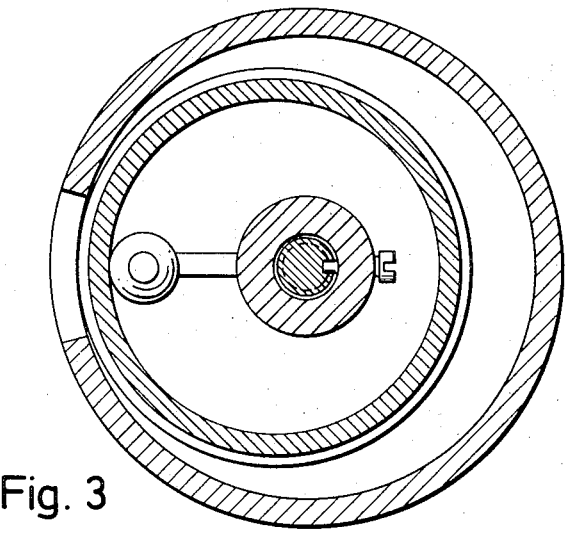
FIG. 3 is a section along the line III—III of FIG. 1.
Figure 2:
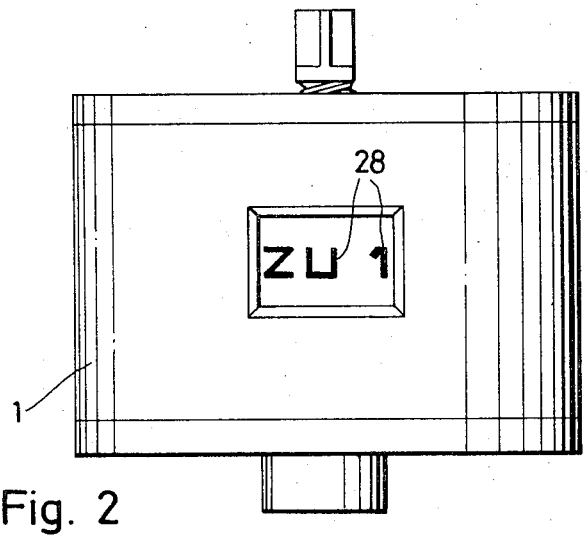
FIG. 2 is a front view of this indicator device.
Figure 4:
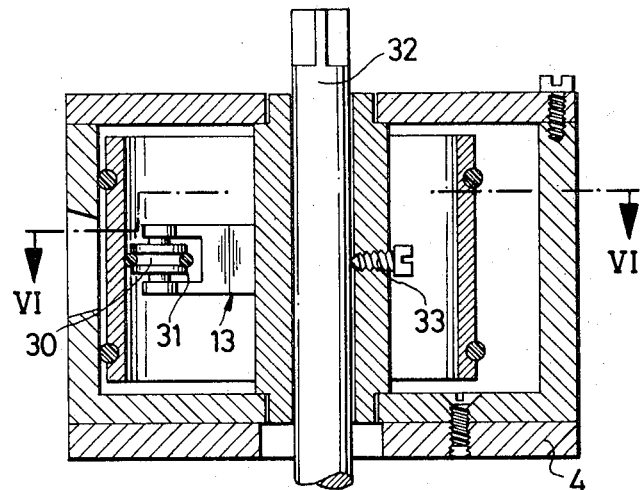
FIG. 4 is a vertical section through the second version of the invention.
Figure 6:
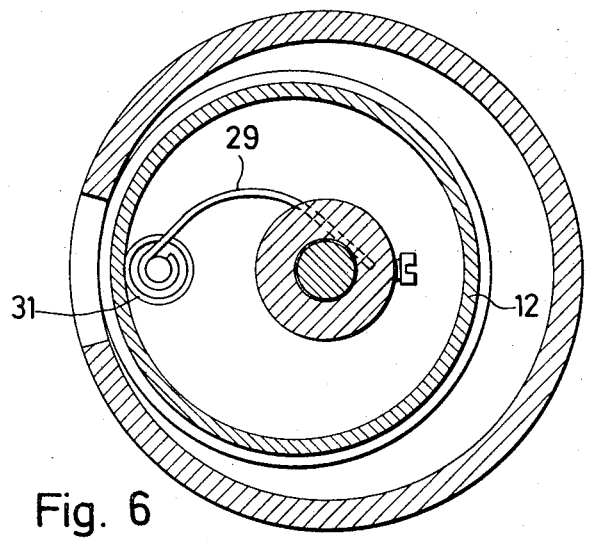
FIG. 6 is a section along the line VI—VI of FIG. 4.
Figure 5:
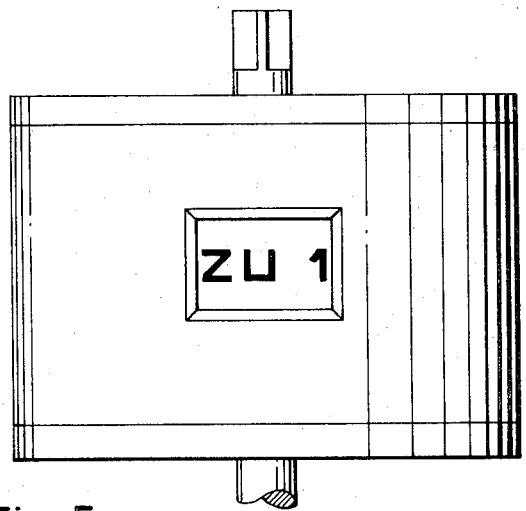
FIG. 5 is a lateral view corresponding to FIG. 4.

Needless to say, the indicator device to which the invention relates can be mounted on any rotatable part, i.e., the invention is not limited to valves or valve spindles. Furthermore, the housing 1 can be connected, in a manner not shown in the drawing, with the spindle 7, so that it cannot rotate in respect of the latter, and the contact pressure device 13 can be fixed in position, e.g. in relation to the valve housing, in which case the necessary relative rotation between the valve housing and the contact pressure element must be rendered possible by a suitable annular slit in the former. This applies not only to the version shown in FIGS. 1 to 3 but also to the second variant, as shown in FIGS. 4 to 6.

In the last example mentioned, a rigid connecting element 16 is replaced by an elastic connecting element consisting of a leaf-type spring. This system in itself makes it possible to dispense with a contact pressure roller of resilient construction. For various reasons, however, the contact pressure roller 30 of this version likewise has been provided with a packing ring 31 by which the force of the pressure spring 29 is transmitted to the rolling element 12. Otherwise there are no constructional or operational differences between this system and the apparatus first described. Since, however, the second example comprises a smooth spindle 32, it has been possible to dispense with the threading 5 in the flange 4 of the housing. The torsionally rigid connection between the spindle 32 and the contact pressure device 13 is obtained by the aid of a pressure screw 33.

It remains to be added that the cylindrical internal boring 11 of the housing 1 can be provided with an internal system of cogging while the rolling element 12 can be provided on its outer periphery with an external system of cogging, in order to replace the friction contact by a form-locking system. Needless to say, a contact pressure roller 14 can also be replaced by a sliding element. The sleeve-shaped supporting body 15 and thus the pivot of the contact pressure device 13 are positioned concentrically with the boring 11 of the housing 1.

I claim:

1. An indicator device for a rotatable component such as a valve spindle, including a housing having a cylindrical bore; a rolling element mounted for rotatable movement relative to the housing; pressure means mounted within the rolling element for pressing the rolling element against the wall of the bore to position the element eccentrically within the cylindrical bore, which pressure means is adapted for non-rotatable connection with the rotatable component and means for indicating the relative position between the housing and the rolling element, wherein upon relative movement between the housing and the rolling element an indication is provided representative of the operative position of the rotatable element.

2. Device in accordance with claim 1, wherein the rolling element is provided with a graduated scale and the housing with a reading mark.

3. Device in accordance with claim 1, wherein the housing occupies a fixed position and the pressure means for the rolling element is rotatable together with the rotatable component.

4. Device in accordance with claim 3, wherein the rolling element consists of a ring of which the interior contains the pressure means.

5. Device in accordance with claim 4, wherein the pressure means has a part thereof resiliently pressed against the rolling element or is constructed as a resilient element.

6. Device in accordance with claim 5, wherein the pressure means consists of a slidable element, a roller or the like, as well as of a supporting body and a connecting element, the latter being constructed as a spring-mounted arm or resilient telescopic arm.

7. Device in accordance with claim 6, wherein the rolling element is provided on the outside, over at least part of its cylinder height, with a material of a high coefficient of friction, particularly rubber or plastic, and wherein the boring of the housing has a satisfactory gripping capacity.

8. Device in accordance with claim 7, wherein the rolling element is provided with an external and the housing with an internal system of teeth.

9. Device in accordance with claim 8, wherein the reading mark is formed by the side edge of a window of the housing or is provided on the said window, while the graduated scale is provided on the outer periphery of the rolling element.

10. Device in accordance with claim 9, wherein the pressure means includes a screw engageable in a longitudinal groove provided in a spindle of the rotatable member.

11. Device in accordance with claim 10, wherein the pressure means is provided with a casing which can be mounted on the component or on the valve spindle and which serves as a supporting body and which is at the same time constructed as a bearing shaft for the housing.

* * * * *